United States Patent
Aihara

(10) Patent No.: US 9,544,354 B2
(45) Date of Patent: Jan. 10, 2017

(54) REMOTE OPERATION SYSTEM, USER TERMINAL, AND REMOTE OPERATION METHOD

(75) Inventor: Hideaki Aihara, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 630 days.

(21) Appl. No.: 13/989,159

(22) PCT Filed: Oct. 31, 2011

(86) PCT No.: PCT/JP2011/006081
§ 371 (c)(1),
(2), (4) Date: May 23, 2013

(87) PCT Pub. No.: WO2012/090370
PCT Pub. Date: Jul. 5, 2012

(65) Prior Publication Data
US 2013/0268636 A1 Oct. 10, 2013

(30) Foreign Application Priority Data
Dec. 28, 2010 (JP) .................. 2010-292028

(51) Int. Cl.
*G06F 15/16* (2006.01)
*H04L 29/08* (2006.01)
(Continued)

(52) U.S. Cl.
CPC ............ *H04L 67/02* (2013.01); *G08C 17/00* (2013.01); *G08C 17/02* (2013.01); *H04W 4/14* (2013.01);
(Continued)

(58) Field of Classification Search
None
See application file for complete search history.

(56) References Cited

U.S. PATENT DOCUMENTS

| 6,862,626 B1 * | 3/2005 | Ryu | H04L 29/06 370/401 |
| 7,085,817 B1 * | 8/2006 | Tock | G06F 17/30902 707/E17.12 |

(Continued)

FOREIGN PATENT DOCUMENTS

| CN | 1225773 A | 8/1999 |
| JP | 2002-252875 | 9/2002 |

(Continued)

OTHER PUBLICATIONS

International Search Report, PCT/JP2011/006081, Dec. 6, 2011.
Chinese First Office Action dated Nov. 24, 2014; Application No. 201180063420.9.

Primary Examiner — Thomas Dailey
(74) Attorney, Agent, or Firm — Young & Thompson

(57) ABSTRACT

A remote operation system includes a user terminal 10 that includes a server function unit for operating an internal function of the terminal according to remote operation, a support terminal 20 that remotely operates the user terminal 10, and a relay server 30 that includes an access management unit for holding an access timing to start remote operation of the user terminal 10 by the support terminal 20 and executes access to the user terminal 10 at the access timing. When being accessed by the relay server 30, the user terminal 10 starts up the server function unit to notify the support terminal 20 that the server function unit has been started up. When being notified that the server function unit has been started up, the support terminal 20 starts up a remote operation application to execute remote operation of the user terminal 10.

9 Claims, 7 Drawing Sheets

(51) Int. Cl.
   *G08C 17/00*     (2006.01)
   *G08C 17/02*     (2006.01)
   *H04W 4/14*      (2009.01)

(52) U.S. Cl.
   CPC ....... *G08C 2201/40* (2013.01); *G08C 2201/42* (2013.01); *G08C 2201/93* (2013.01)

(56) References Cited

U.S. PATENT DOCUMENTS

| | | | |
|---|---|---|---|
| 7,694,018 B2 * | 4/2010 | Wuebker | H04L 63/02 709/238 |
| 8,146,141 B1 * | 3/2012 | Grandcolas | H04L 9/0825 726/5 |
| 2003/0065791 A1 * | 4/2003 | Garg | H04L 29/12009 709/229 |
| 2008/0212495 A1 * | 9/2008 | Stirbu | H04L 61/2015 370/254 |
| 2009/0001161 A1 * | 1/2009 | Uchiyama | G06F 21/32 235/382 |
| 2010/0062744 A1 * | 3/2010 | Ibrahim | G06F 11/1464 455/411 |

FOREIGN PATENT DOCUMENTS

| | | |
|---|---|---|
| JP | 2003-510903 | 3/2003 |
| JP | 2003-125466 | 4/2003 |
| JP | 2003-224886 | 8/2003 |
| JP | 2005-198099 | 7/2005 |
| JP | 2007-336112 | 12/2007 |
| JP | 2009-290457 | 12/2009 |

* cited by examiner

REMOTE OPERATION SYSTEM, USER TERMINAL, AND REMOTE OPERATION METHOD

TECHNICAL FIELD

The present invention relates to a remote operation system which enables an operation of a communication device or the like from a support terminal that is remotely located.

BACKGROUND ART

There is a need for a manager of a company to separately operate or manage a mobile telephone for business use (remotely operated terminal) carried by an employee using a remote operation terminal for business purposes even when the employee is outside the company (e.g., when the employee is away on business). For example, as one business purpose, the manager may need to check the movement history for the past few days of the user who carries the mobile telephone for business use. In such a case, the manager is able to check the movement history of the user by allowing the manager to access the record of information measured by a global positioning system (GPS) in the mobile telephone for business use from the remote operation terminal.

As another business purpose, it may be required to read out and view photographs taken at a customer's office from the mobile telephone for business use. As another business purpose, it may be required to set the schedule of the employee on the following day in a scheduler of the remotely operated terminal from the remote operation terminal. One possible example in such a case is writing information of a customer that the employee plans to visit or the like into a database application of the remotely operated terminal from the remote operation terminal.

In order to execute the aforementioned operations, one possible method is to install an information server in the remotely operated terminal, and upon receiving a request from a relay server that intermediates communication with the remote operation terminal according to a predetermined protocol, the remotely operated terminal transmits positional information or photographic data based on processing by the information server or writes data received by the relay server into the mobile telephone. For example, remote operation may be achieved using a typical Web technology in which, when the remotely operated terminal receives a hyper text transfer protocol (HTTP) request including a uniform resource locator (URL) and a port number from outside the terminal, a Web server (information server) executes internal processing in the terminal to send a predetermined response to the HTTP request.

Patent literature 1 discloses a method of starting up an application using a short message (SMS) of a mobile telephone system. A mobile telephone is able to access an external server by selecting a URL transmitted using the SMS. It is also possible to start up a server in the mobile telephone by setting an internal server to the URL transmitted using the SMS.

Furthermore, Patent literature 2 discloses a method of adjusting delivery time from an SMS delivery server to an SMS receiving terminal when a terminal which receives SMS information (hereinafter referred to as an SMS receiving terminal) cannot receive an SMS depending on the states of the SMS receiving terminal (e.g., outside the service area, exhaustion of battery, operational conflicts). More specifically, the delivery time is adjusted by notifying the SMS delivery server of delivery time from the SMS receiving terminal.

CITATION LIST

Patent Literature

Patent literature 1: Published Japanese Translation of PCT International Publication for Patent Application, No. 2003-510903

Patent literature 2: Japanese Unexamined Patent Application Publication No. 2009-290457

SUMMARY OF INVENTION

Technical Problem

However, according to Patent literatures 1 and 2, the delivery time of the SMS information is determined based on the circumstance on the side of the SMS receiving terminal, and the circumstance on the side of the terminal that transmits the SMS information is not considered. When the manager desires to start up the Web server of the remotely operated terminal through the relay server in order to acquire desired information from the remotely operated terminal using the remote operation terminal, the remotely operated terminal may be in an area outside the service area due to some reason (e.g., in a subway) and is not necessarily ready to start up the Web server. Therefore, when the remote operation could not be achieved, the manager needs to repeat the similar operation again. In summary, not knowing the state of the remotely operated terminal, the manager ends up repeating the similar operation again and again if the Web server could not be started up. In this case, reconnection may not be made depending on the states of the remotely operated terminal. In this way, when trying to remotely operate the remotely operated terminal, the manager performs the similar operation a plurality of times depending on the states of the remotely operated terminal, which may make the manager feel annoyed.

In order to solve the aforementioned problems, the present invention aims to provide a remote operation system, a user terminal, and a remote operation method that are capable of reducing the burden imposed on a person who performs remote operation upon operating a terminal.

Solution to Problem

A remote operation system according to a first exemplary aspect of the present invention includes: a user terminal that includes a server function unit for operating an internal function of a terminal according to remote operation; a support terminal that remotely operates the user terminal; and a relay server that includes an access management unit for holding an access timing to start remote operation of the user terminal by the support terminal, the relay server executing access to the user terminal at the access timing, in which: when being accessed by the relay server, the user terminal starts up the server function unit to notify the support terminal that the server function unit has been started up, and upon receiving the notification that the server function unit has been started up, the support terminal starts up a remote operation application to execute the remote operation of the user terminal.

A user terminal according to a second exemplary aspect of the present invention includes: a server function unit for operating an internal function of a terminal according to remote operation; a controller for starting up the server function unit when start of the server function unit is requested to perform the remote operation; and a communication unit for notifying a support terminal that the server function unit has been started up, the support terminal performing the remote operation, in which, upon receiving the notification that the server function unit has been started up, the server function unit accepts the remote operation performed by the support terminal which has started a remote operation application.

A remote operation method according to a third exemplary aspect of the present invention includes: receiving a request to start a server function unit that operates an internal function of a terminal according to remote operation to remotely operate a user terminal: starting up the server function unit after receiving the request; notifying a support terminal that the server function unit has been started up, the support terminal performing the remote operation; and accepting the remote operation from the support terminal which has received the notification that the server function unit has been started up.

Advantageous Effects of Invention

According to the present invention, it is possible to provide a remote operation system, a user terminal, and a remote operation method that are capable of reducing the burden imposed on a person who performs remote operation upon operating a terminal.

DESCRIPTION OF EMBODIMENTS

First Exemplary Embodiment

Figure 1:
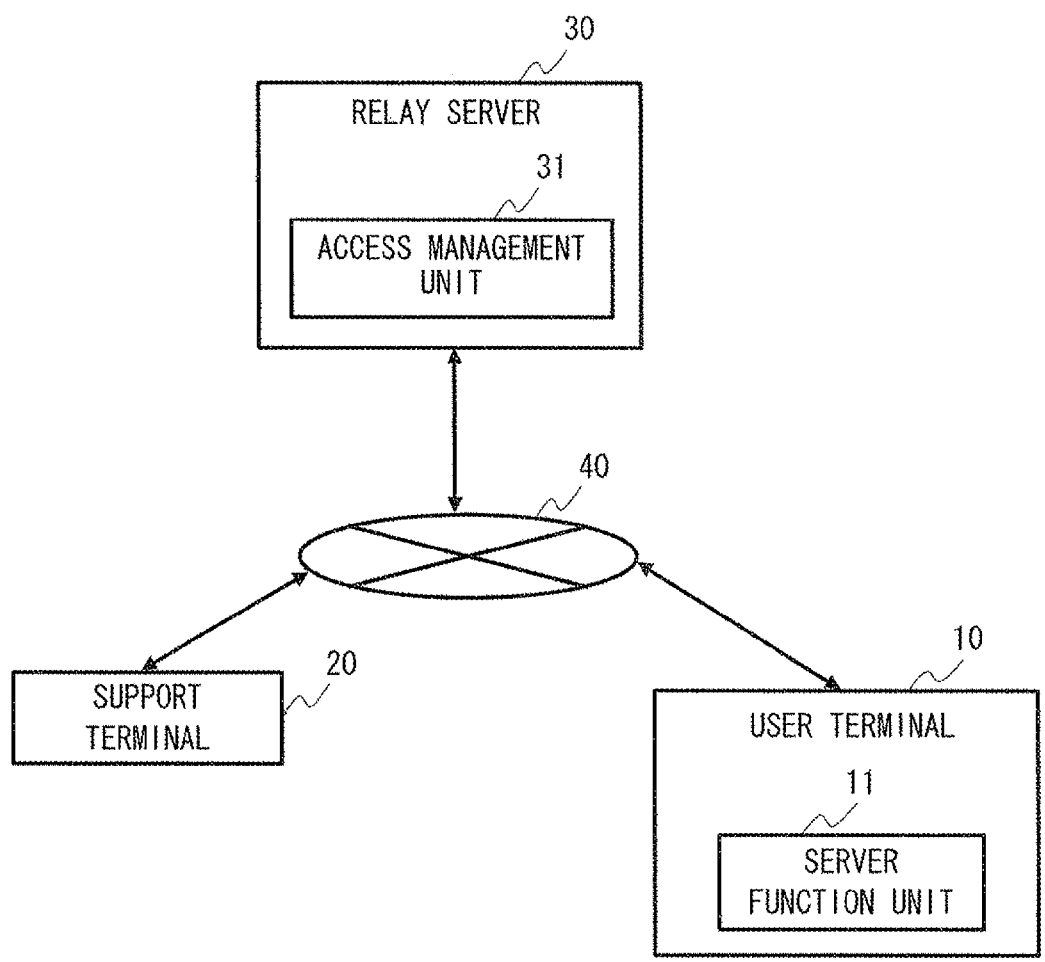
FIG. 1 is a configuration diagram of a remote operation system according to a first exemplary embodiment.

Hereinafter, with reference to the drawings, exemplary embodiments of the present invention will be described. With reference to FIG. 1, a remote operation system according to a first exemplary embodiment of the present invention will be described. The remote operation system includes a user terminal 10, a support terminal 20, and a relay server 30. The user terminal 10, the support terminal 20, and the relay server 30 are connected via a network 40.

The network 40 is formed of a public Internet line, an IP network constructed by a communication carrier or the like.

The user terminal 10 may be a mobile telephone terminal, a smartphone terminal, a notebook personal computer or the like, which is a device that includes a communication function and that can be easily carried. The communication function included in the user terminal 10 may be, for example, a function of performing communication through a wireless network provided by a mobile communication carrier, i.e., a public communication network, or a communication function using wireless fidelity (WiFi) that performs wireless LAN communication.

The user terminal 10 includes a server function unit 11. The server function unit 11 operates an internal function of the terminal according to a request of remote operation. The remote operation includes performing an input operation for a remote terminal, monitoring a display screen of the remote terminal, changing settings of the remote terminal, transferring data to a memory in the remote terminal, retrieving data from the remote terminal and the like. Further, the internal function is a function installed in the terminal, and is a function achieved by the combination of one or a plurality of modules.

The support terminal 20 is a device used to remotely operate the user terminal 10, and may be a server device, a personal computer, a smartphone terminal, a mobile telephone terminal or the like. The support terminal 20 is a terminal used to remotely operate the user terminal 10. A person who performs remote operation using the support terminal 20 is referred to as a supporter. The supporter executes remote operation of the user terminal 10 using the support terminal 20.

The relay server 30 relays communication between the user terminal 10 and the support terminal 20. The relay server 30 includes an access management unit 31. The access management unit 31 holds an access timing to start remote operation of the user terminal 10 by the support terminal 20. The access timing may be notified from the support terminal 20 to the relay server 30 based on the information input by the supporter. The access timing may either be defined time or time with a predetermined width (e.g., five minutes, one hour). The relay server 30 accesses the user terminal 10 at the access timing.

When being accessed from the relay server 30, the user terminal 10 starts up the server function unit 11. Further, the user terminal 10 notifies the support terminal 20 that the server function unit 11 has been started up. The user terminal 10 may either notify the support terminal 20 that the server function unit 11 has been started up through the relay server 30 or directly notify the support terminal 20.

Upon receiving notification from the user terminal 10 or the relay server 30 that the server function unit 11 has been started up, the support terminal 20 starts up a remote operation application to execute remote operation of the user terminal 10.

As described above, by using the remote operation system as shown in FIG. 1, the support terminal 20 is able to start up the remote operation application to remotely operate the user terminal 10 after being notified from the user terminal 10 that the server function unit 11 has been started up. Therefore, the supporter is able to execute the remote operation in a state in which the server function unit 11 of the user terminal 10 has been started up. This eliminates the need to execute the same operation a plurality of number of times to start up the server function unit 11 of the user terminal 10.

Figure 2:
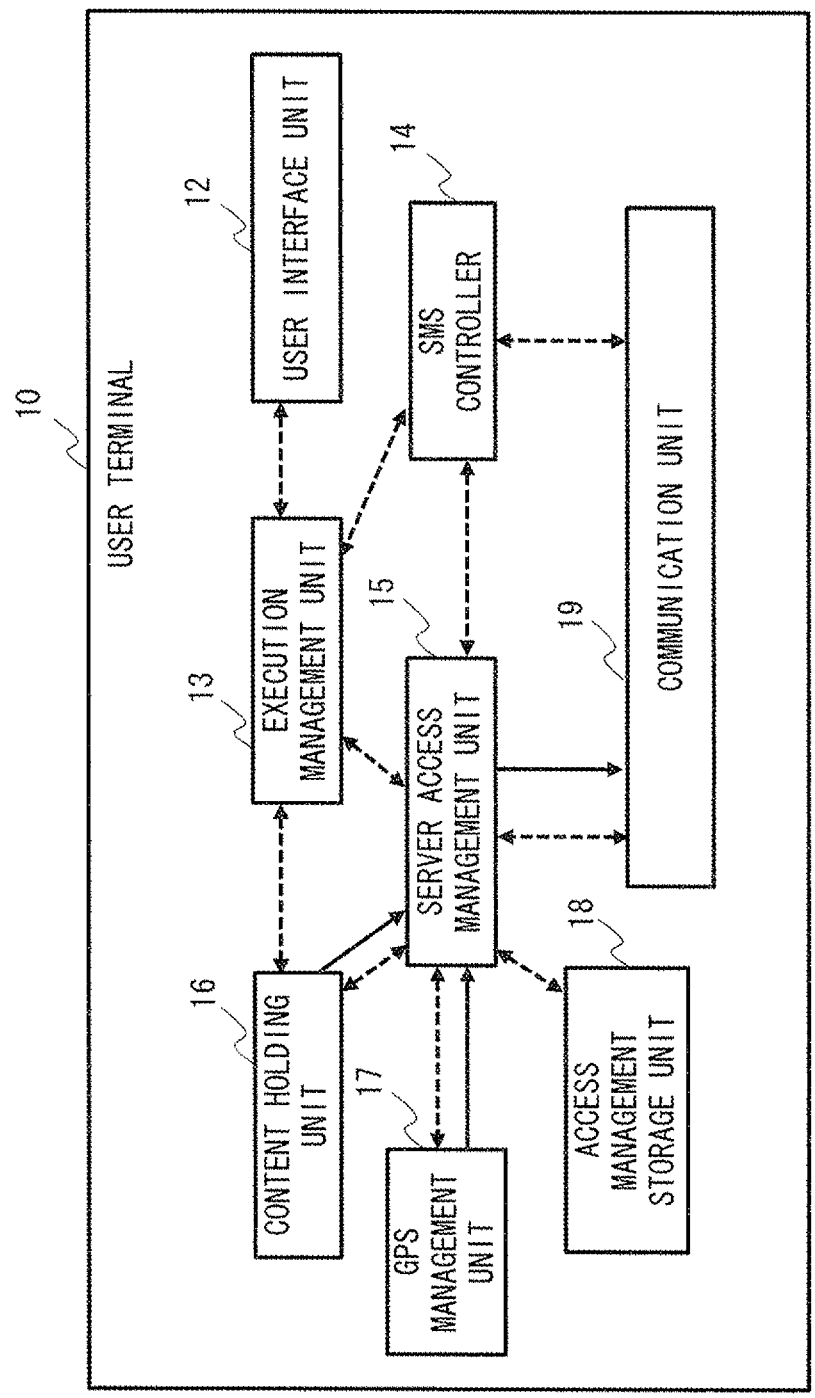
FIG. 2 is a configuration diagram of a user terminal according to the first exemplary embodiment.

Subsequently, with reference to FIG. 2, a detailed configuration example of the user terminal 10 according to the first exemplary embodiment of the present invention will be described. The user terminal 10 includes a user interface unit 12, an execution management unit 13, an SMS controller 14, a server access management unit 15, a content holding unit 16, a GPS management unit 17, an access management storage unit 18, and a communication unit 19. In FIG. 2, solid lines show a flow of data to be operated and dashed lines show a flow of data of control system. The same holds true for the subsequent drawings.

The user interface unit 12 receives input from a user using a key input unit (not shown). The key input unit includes a keyboard, a numerical keypad, buttons, a touch pad or the like. Further, the user interface unit 12 is able to output information processing results in the user terminal 10 to a display unit (not shown), thereby allowing the user to check the information processing results. A liquid crystal display or the like is used as the display unit.

The execution management unit 13 performs execution management of applications or various modules included in the user terminal 10 according to user's instruction information input from the user interface unit 12. In short, the execution management unit 13 controls a timing to start an application or the like based on the information instructed by the user. The execution management unit 13 is formed of a central processing unit (CPU), a micro processing unit (MPU) or the like.

The content holding unit 16 holds photos and the like taken by a camera function of the user terminal 10. The content holding unit 16 may also hold moving images or the like taken by a video function of the user terminal 10. The content holding unit 16 is formed of a memory or the like in the user terminal 10.

The GPS management unit 17 measures the current position using a GPS. Further, the GPS management unit 17 may hold previous positional information acquired regularly. It is possible to indicate a movement history of the mobile telephone terminal 11 by chronologically managing the positional information previously measured with time stamps. Further, the GPS management unit 17 may hold latitude/longitude information acquired using the GPS, or may convert the latitude/longitude information into address information or the like using map information held in a memory or the like in the user terminal 10 to hold the address information or the like.

The SMS controller 14 analyzes SMS information notified from the relay server 30. The SMS information is a text message. The processing content such as a request to start up the server function or the like is set as the SMS information. The SMS controller 14 receives the SMS information transmitted from the relay server 30 through the communication unit 19. When a request to start the server function is set in the SMS information transmitted from the relay server 30 (hereinafter, such SMS information is referred to as a PWS start SMS), the SMS controller 14 outputs information related to a request to start up a PWS to the execution management unit 13 to start up a Web server function (PWS: Personal Web Server).

Upon receiving information related to the request to start up the PWS from the SMS controller 14, the execution management unit 13 is able to determine that the PWS is not to be started if another function currently operated in the terminal conflicts with the start of the PWS and it is impossible to start up the PWS. Further, the execution management unit 13 is able to determine that the PWS is not to be started also when the processing load in the terminal is high, for example. When there are no circumstances that prevent the start of the PWS stated above, the execution management unit 13 instructs the server access management unit 15 to start up the PWS.

Upon receiving the PWS start SMS from the relay server 30 through the communication unit 19, the server access management unit 15 starts up the Web server function (PWS: Personal Web Server). More specifically, the relay server 30 analyzes the transmitted SMS information by the SMS controller 14. The server access management unit 15 starts up the PWS upon receiving the instruction from the execution management unit 13 to start up the PWS based on the analysis result. When the PWS is started up, the server access management unit 15 transmits SMS information notifying that the PWS has been started up (hereinafter referred to as a PWS start notification SMS). The server access management unit 15 transmits the PWS start notification SMS to the relay server 30 through the communication unit 19.

Further, the server access management unit 15 executes remote operation set to an HTTP request by the relay server 30, to output a response to the HTTP request. The protocol used in the communication between the server access management unit 15 and the relay server 30 or the like is not limited to HTTP. For example, a unique control protocol or the like defined between the server access management unit 15 and the relay server 30 or the like may be used.

The server access management unit 15 may extract photographic data or the like from the content holding unit 16 according to the content of the HTTP request, to output the photographic data or the like that is extracted to the support terminal 20 through the communication unit 19. Further, the server access management unit 15 is able to extract the movement history information of the user terminal 10 from the GPS management unit 17 according to the content of the HTTP request, to output the movement history information that is extracted to the support terminal 20 through the communication unit 19.

The access management storage unit 18 holds authentication information between the user terminal 10 and the relay server 30. For example, the access management storage unit 18 manages an identifier of the relay server 30 which is allowed to perform access in association with the content of remote operation instructed from the support terminal 20 through the relay server 30. Accordingly, the server access management unit 15 is able to accept remote operation when receiving an instruction of the content of remote operation stored in the access management storage unit 18, which is the access from the relay server 30.

Figure 3:
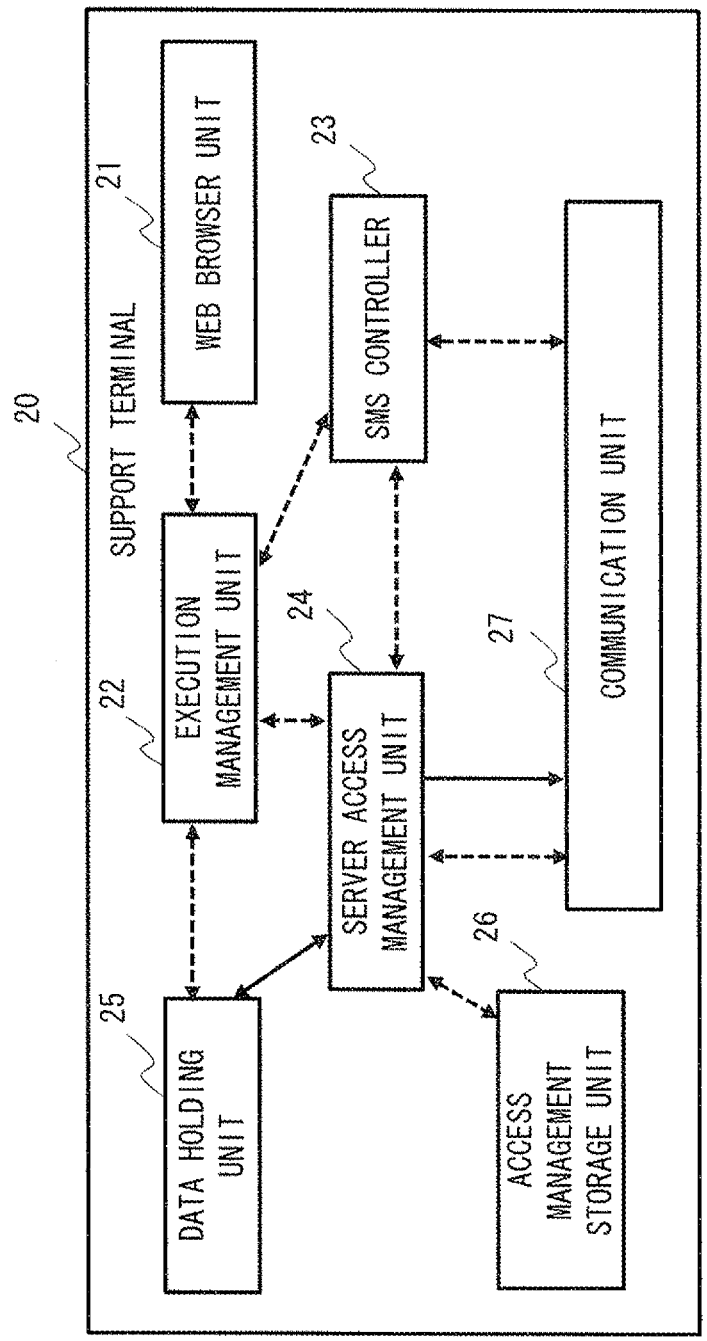
FIG. 3 is a configuration diagram of a support terminal according to the first exemplary embodiment.

Subsequently, with reference to FIG. 3, a detailed configuration example of the support terminal 20 according to the first exemplary embodiment of the present invention will be described. The support terminal 20 includes a Web browser unit 21, an execution management unit 22, an SMS controller 23, a server access management unit 24, a data holding unit 25, an access management storage unit 26, and a communication unit 27.

The Web browser unit 21 outputs information input from the supporter through a Web browser to the execution management unit 22. The supporter inputs the content of execution of remote operation of the user terminal 10 using the Web browser. Further, the supporter inputs an access timing to execute remote operation of the user terminal 10 using the Web browser. The information related to the access timing that is input is transmitted to the relay server 30.

Further, the supporter may directly operate the support terminal 20, or may log into the support terminal 20 through a network to input the content of remote operation and the like using the Web browser unit 21.

The execution management unit 22 performs execution management of various modules or applications included in the support terminal 20 according to user's instruction information input from the Web browser unit 21. In short, the execution management unit 22 controls a timing to start up an application or the like based on the information instructed by the supporter. The execution management unit 22 is formed of a central processing unit (CPU), a micro processing unit (MPU) or the like.

The data holding unit 25 holds image data, movement history data or the like of the user terminal 10 acquired by the user terminal 10 in the remote operation. The supporter is able to view the data held in the data holding unit 25 using a display unit (not shown) of the support terminal 20. Further, the data holding unit 25 is also able to temporarily hold information input from the supporter through the Web browser unit 21. The data holding unit 25 is formed of a memory or the like in the support terminal.

The SMS controller 23 analyzes SMS information notified from the relay server 30. The PWS start notification SMS or the like that notifies start of the PWS of the user terminal 10 is set as the SMS information. Further, the SMS controller 23 receives the SMS information transmitted from the relay server 30 through the communication unit 27. Upon receiving the PWS start notification SMS, the SMS controller 23 outputs to the execution management unit 22 information related to start of the application to execute remote operation (hereinafter referred to as a remote operation application).

Upon receiving notification from the relay server 30 through the communication unit 27 that the PWS of the user terminal 10 has been started up, the server access management unit 24 starts up the remote operation application. Specifically, the SMS controller 23 analyzes the SMS information transmitted from the relay server 30, and upon receiving an instruction to start up the remote operation application from the execution management unit 22 based on the analysis result, the server access management unit 24 starts up the remote operation application.

The support terminal 20 executes the remote operation application, and extracts, by remote operation, the movement history information of the user terminal 10, the photographic data or the like from the user terminal 10.

The access management storage unit 26 holds authentication information between the support terminal 20 and the relay server 30. For example, the access management storage unit 26 manages the identifier of the relay server 30 that relays execution of remote operation. Accordingly, the server access management unit 24 is able to allow only the communication with the relay server 30 stored in the access management storage unit 26 when executing remote operation.

Figure 4:
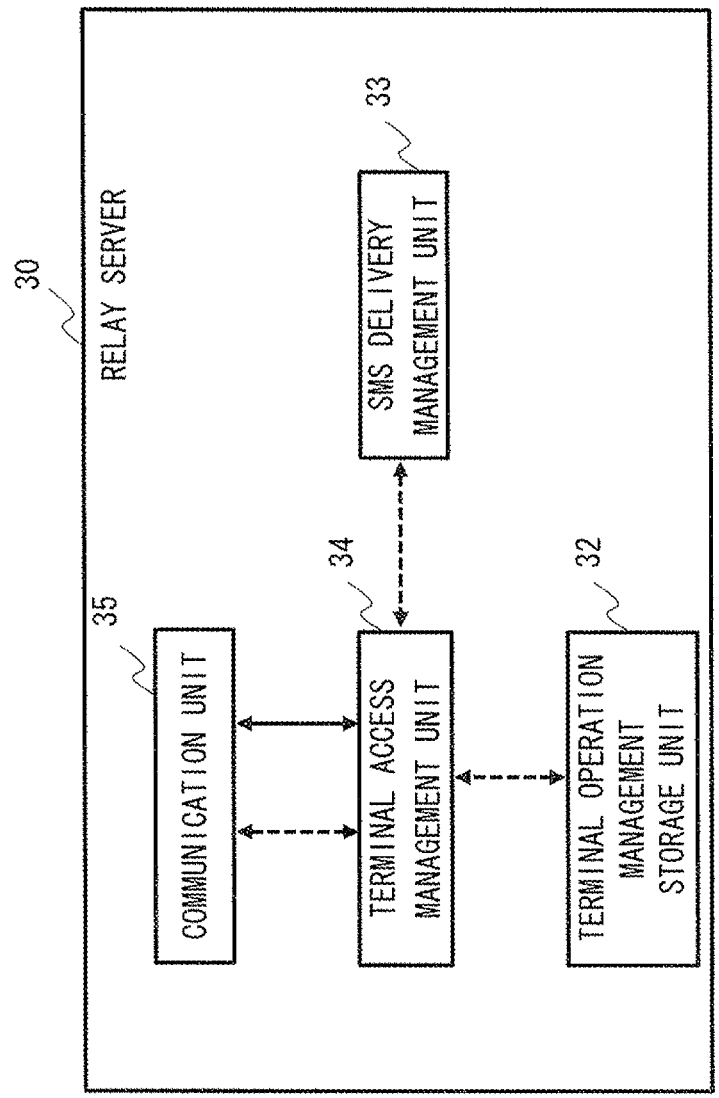
FIG. 4 is a configuration diagram of a relay server according to the first exemplary embodiment.

Subsequently, with reference to FIG. 4, a detailed configuration example of the relay server 30 according to the first exemplary embodiment of the present invention will be described. The relay server 30 includes a terminal operation management storage unit 32, an SMS delivery management unit 33, a terminal access management unit 34, and a communication unit 35.

The terminal operation management storage unit 32 holds the content of remote operation notified from the support terminal 20. When executing remote operation of the user terminal 10, the support terminal 20 transmits information related to remote operation to the user terminal 10 through the relay server 30. Thus, the terminal operation management storage unit 32 of the relay server 30 temporarily holds the content of remote operation notified from the support terminal 20. Alternatively, the terminal operation management storage unit 32 may hold the content of remote operation allowed in the user terminal 10 in advance. In this case, when the support terminal 20 tries to execute remote operation other than the content of the remote operation which is held in the terminal operation management storage unit 32, the execution of the remote operation can be refused.

The SMS delivery management unit 33 holds a timing to access the user terminal 10 specified by the support terminal 20. The SMS delivery management unit 33 notifies the PWS start SMS to access the user terminal 10 at the access timing that is held. The SMS information is notified to the user terminal 10 through the terminal access management unit 34 and the communication unit 35.

The terminal access management unit 34 accesses the user terminal 10 specified by the support terminal 20. Further, when the execution of remote operation is instructed from the support terminal 20, the terminal access management unit 34 reads out the content of remote operation stored in the terminal operation management storage unit 32, sets the content of remote operation to the HTTP request, and notifies the user terminal 10 of the content of remote operation through the communication unit 35.

Subsequently, with reference to FIG. 5, a flow of processing of setting authentication information among the user terminal 10, the support terminal 20, and the relay server 30 according to the first exemplary embodiment of the present invention will be described. First, the user terminal 10 installs a controlled application (S20). The controlled application is an application that includes a WEB server function (PWS), for example. Further, the support terminal 20 installs a control application (S21). The control application is, for example, an application for performing remote operation (remote operation application).

Next, the user terminal 10 notifies the relay server 30 of authentication information (S22). The authentication information is, for example, an identifier of the user terminal 10, an identifier of the support terminal 20 that is allowed to perform remote operation, content of remote operation to be allowed, an SMS-ID to transmit or receive SMS information and the like. The SMS-ID is an ID specific to each terminal. Further, the support terminal 20 notifies the relay server 30 of authentication information (S23). The authentication information notified from the support terminal 20 to the relay server 30 is, for example, an identifier of the support terminal 20, an SMS-ID or the like.

Next, the relay server 30 sets the authentication information notified from the user terminal 10 and the support terminal 20 in a memory (not shown) in the device or the terminal operation management storage unit 32. For example, the relay server 30 manages the identifier of the user terminal 10, the identifier of the support terminal 20, and the content of remote operation allowed for the support terminal 20 by the user terminal 10 in association with one another. Accordingly, when the support terminal 20 tries to execute an operation for the user terminal 10 other than the content of remote operation that is allowed, the relay server 30 is able to refuse the operation.

Figure 5:
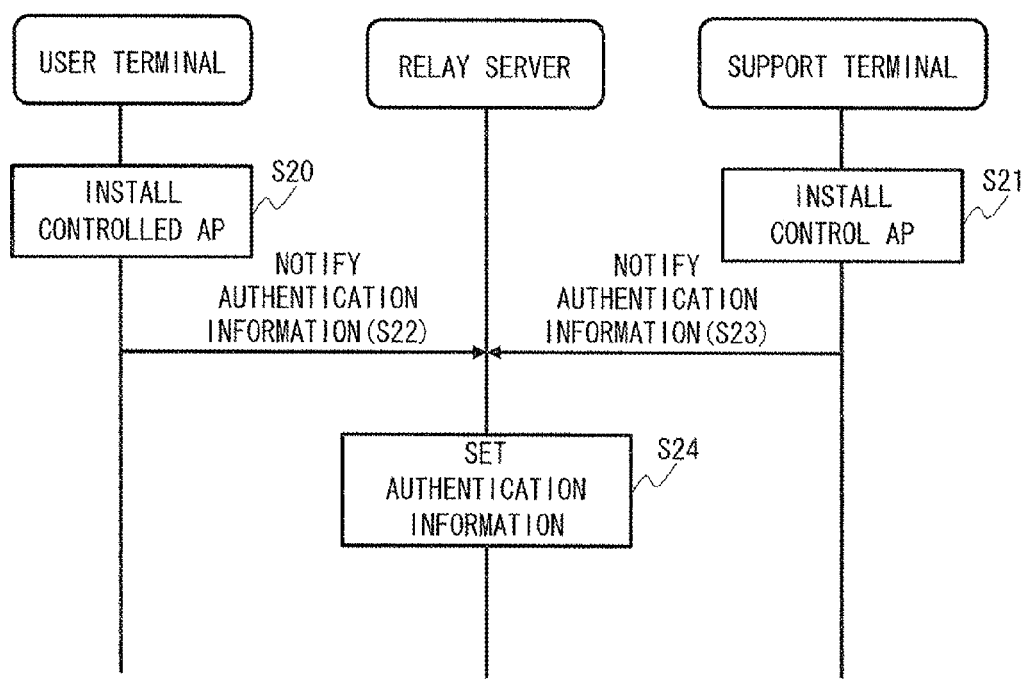
FIG. 5 is a sequence showing processing of setting authentication information according to the first exemplary embodiment.

As described above, by performing the processing of setting authentication information in FIG. 5, the support terminal 20 is able to execute remote operation of the user terminal 10 through the relay server 30.

Figure 6:
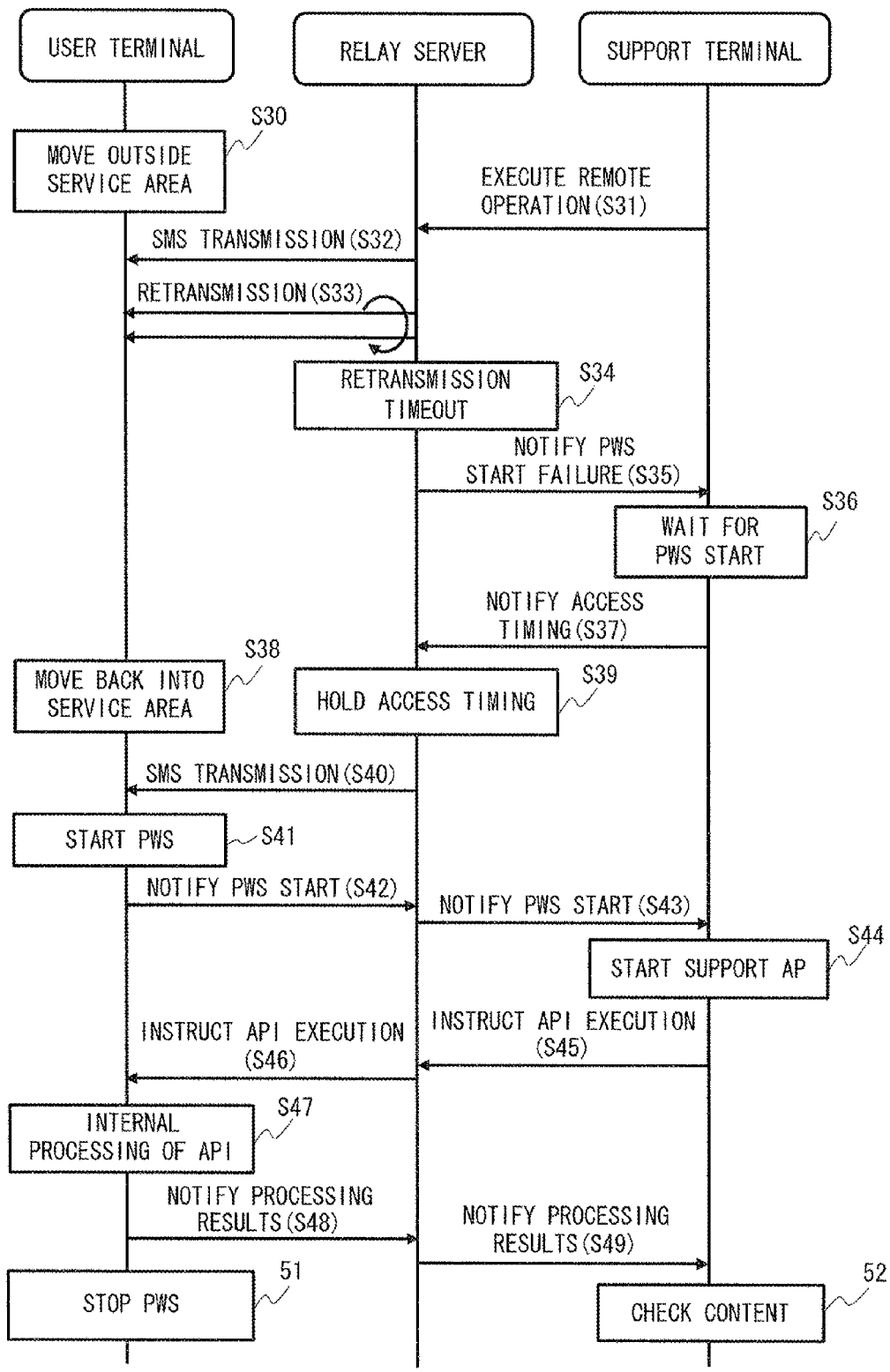
FIG. 6 is a sequence showing details of remote operation according to the first exemplary embodiment.

Subsequently, with reference to FIG. 6, a flow of details of remote operation according to the first exemplary embodiment of the present invention will be described. First, the user terminal 10 is moved to an area outside a service area (S30). The area outside the service area means the area in which, when the user terminal is a mobile telephone terminal, the user terminal is not able to communicate with a base station. Next, while the user terminal 10 is outside the service area, the support terminal 20 notifies the relay server

30 of execution of remote operation (S31). Upon receiving the notification of execution of remote operation, the relay server 30 transmits the PWS start SMS to the user terminal 10 (S32). However, since the user terminal 10 has moved outside the service area in Step S30, a response to the SMS information that is transmitted is not sent from the user terminal 10. Therefore, the relay server 30 repeats retransmission of the PWS start SMS to the user terminal 10 a plurality of times.

Next, the relay server 30 detects retransmission timeout (S34). The retransmission timeout means a state in which no response is sent from the user terminal 10 within a predetermined period of time to retransmission of the SMS information sent from the relay server 30 to the user terminal 10.

Next, the relay server 30 transmits PWS start failure notification to the support terminal 20 (S35). Then, the support terminal 20 that receives the PWS start failure notification causes the display unit of the support terminal 20 to display a screen to select whether to wait for start and a screen to input time which will be convenient for the supporter (S36). The screen to select whether to wait for start means a screen to select whether to execute remote operation after the PWS of the user terminal 10 is started up. When the supporter selects execution of remote operation after the PWS is started up, the supporter inputs time at which the supporter executes remote operation next time into an input screen. The time information input to the user terminal 10 by the supporter is notified to the relay server 30 as access timing (S37).

Next, the relay server 30 stores the received access timing information in the SMS delivery management unit 33 (S39). Then, the relay server 30 transmits the PWS start SMS to the user terminal 10 at predetermined time (S40). It is assumed that the user terminal 10 is moved back into an area in the service area before the PWS start SMS is transmitted in Step S40 (S38). The area in the service area means the area in which, when the user terminal is a mobile telephone terminal, the user terminal is able to communicate with a base station.

Next, upon receiving the PWS start SMS from the relay server 30, the user terminal 10 starts up the PWS (S41). When the PWS is started up, the user terminal 10 transmits the PWS start notification SMS to the relay server 30 (S42). The relay server 30 transmits the received PWS start notification SMS to the support terminal 20 (S43).

Upon receiving the PWS start notification SMS, the support terminal 20 starts up the remote operation application (S44). The support terminal 20 executes an API related to remote operation, and transmits an API execution instruction to the relay server 30 (S45). The relay server 30 transmits the received API execution instruction to the user terminal 10 (S46).

Next, the user terminal 10 executes internal processing based on the API execution instruction (S47). An example of internal processing in the user terminal 10 will now be described. For example, when the API execution instruction indicates the content "collecting the movement history for the past few days of the user who operates the user terminal 10", the server access management unit 15 extracts movement history information held in the GPS management unit 17. Further, when the API execution instruction indicates the content "collecting photos taken by the user terminal 10 at a customer's office", the server access management unit 15 extracts the photographic data held in the content holding unit 16.

Next, the user terminal 10 transmits the movement history information, the photographic data or the like that is extracted to the relay server 30 as processing result notification (S48). The relay server 30 transmits the received processing result notification to the support terminal 20 (S49). Upon receiving the processing result notification, the support terminal 20 checks the content of remote operation that is executed (S52). Further, upon completion of the internal processing on the API, the user terminal 10 stops the operation of the PWS (S51).

As described above, by using the remote operation system according to the first exemplary embodiment of the present invention, when the user terminal 10 cannot immediately accept the operation from the support terminal 20 due to some reason (e.g., the user terminal 10 is outside the service area), time convenient for the supporter, i.e., the next access timing by the supporter, can be registered in the relay server 30. Based on the information of access timing, the relay server 30 transmits the PWS start SMS to the user terminal 10. When the user terminal 10 which has moved back into the service area from the area outside the service area receives the PWS start SMS, it starts up the PWS. Further, the user terminal 10 transmits the PWS start notification SMS to the support terminal 20. Upon receiving the PWS start notification SMS, the support terminal 20 starts up the remote operation application.

Accordingly, the support terminal 20 starts up the remote operation application after the PWS has been started up, thereby being able to prevent execution of the same operation a plurality of times to access the user terminal 10 in a state in which the PWS has not been started up. Further, the relay server 30 accesses the user terminal 10 when it is convenient for the supporter, and the remote operation application can be automatically started up when the PWS of the user terminal 10 is started up, thereby being able to reduce the burden on the supporter upon performing the operation.

Further, the user terminal 10 stops the operation of the PWS upon completion of the internal processing, thereby being able to suppress power consumption in the user terminal 10.

Second Exemplary Embodiment

Figure 7:
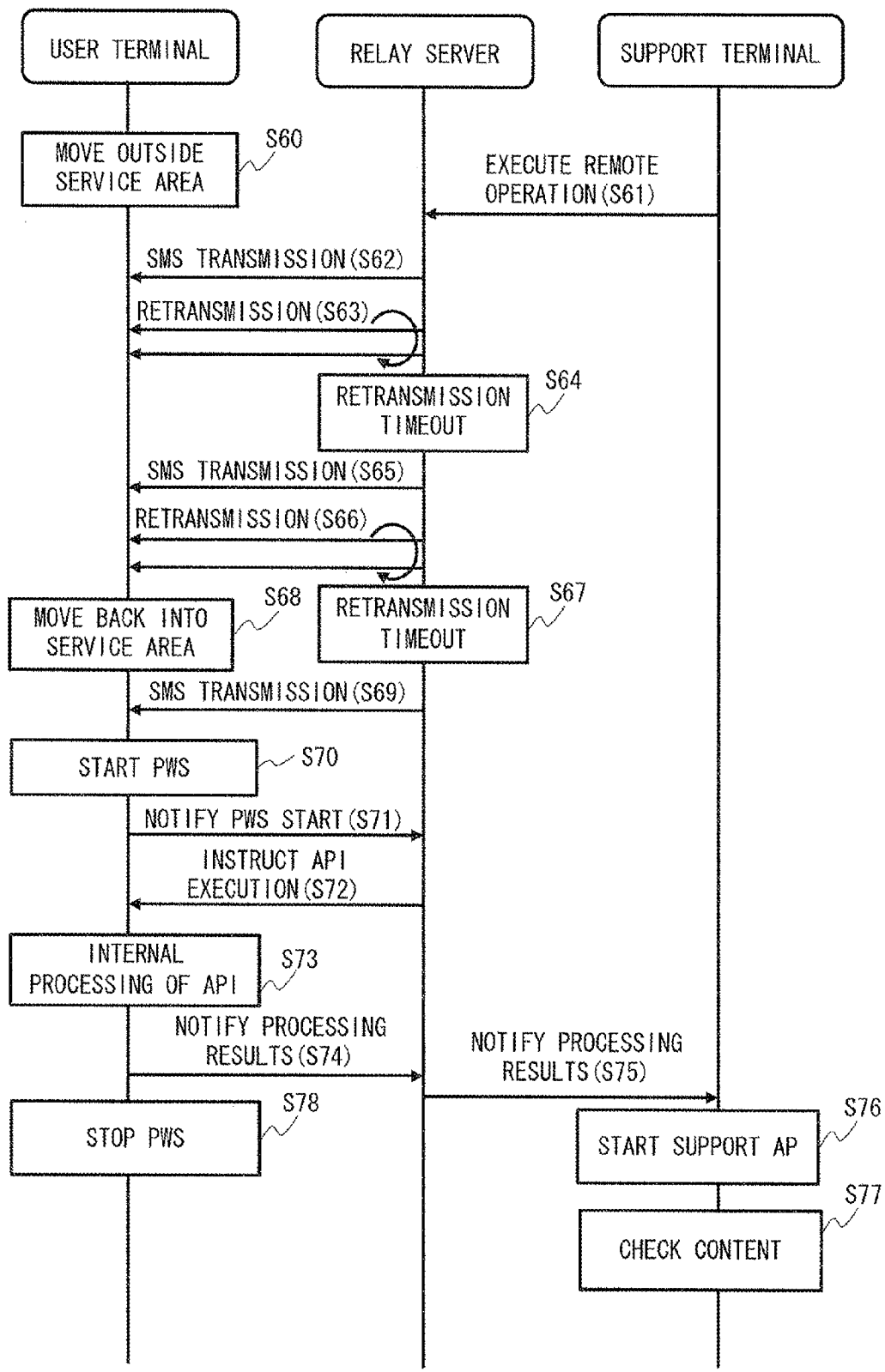
FIG. 7 is a sequence showing details of remote operation according to a second exemplary embodiment.

Next, with reference to FIG. 7, a flow of an operation of remote operation according to a second exemplary embodiment of the present invention will be described. Since Steps S60 to S64 are identical to Steps S30 to S34 shown in FIG. 6, detailed description thereof will be omitted. Upon detecting retransmission timeout in Step S64, the relay server 30 regularly transmits the PWS start SMS to the user terminal 10 (S65 to S69).

When the user terminal 10 receives the PWS start SMS in a state in which the user terminal 10 has moved back into the service area, the user terminal 10 starts up the PWS (S70). When the PWS is started, the user terminal 10 outputs the PWS start notification to the relay server 30 (S71). Upon receiving the PWS start notification, the relay server 30 executes the remote operation that is held in advance and transmits the API execution instruction to the user terminal 10 (S72). The relay server 30 may hold the content of remote operation when receiving the instruction to execute remote operation in Step S61. Alternatively, the relay server 30 may execute the remote operation notified from the user terminal 10 as the remote operation allowed for the support terminal 20 as the remote operation that is held in advance. Since Steps S73 to S75 are the same to Steps S47 to S49 shown in FIG. 6, detailed description will be omitted.

Upon receiving the processing result notification from the relay server 30, the support terminal 20 starts up the remote operation application (S76). The support terminal 20 starts up the remote operation application to check the result of executing the remote operation (S77). Further, when the internal processing of the API is ended, the user terminal 10 stops the operation of the PWS.

As described above, by using the remote operation system according to the second exemplary embodiment of the present invention, even when the user terminal 10 is outside the service area, for example, the relay server 30 regularly accesses the user terminal 10 after the supporter once executes remote operation. Further, the relay server 30 transmits the API execution instruction to the user terminal 10. This helps to reduce the burden imposed on the supporter upon operating the support terminal 20.

Note that the present invention is not limited to the exemplary embodiments stated above, but may be changed as appropriate without departing from the spirit of the present invention.

While the present invention has been described above with reference to the exemplary embodiments, the present invention is not limited to the above exemplary embodiments. The configuration and details of the present invention can be modified in various manners which can be understood by those skilled in the art within the scope of the invention.

This application is based upon and claims the benefit of priority from Japanese Patent Application No. 2010-292028, filed on Dec. 28, 2010, the disclosure of which is incorporated herein in its entirety by reference.

REFERENCE SIGNS LIST

10 USER TERMINAL
11 SERVER FUNCTION UNIT
12 USER INTERFACE UNIT
13 EXECUTION MANAGEMENT UNIT
14 SMS CONTROLLER
15 SERVER ACCESS MANAGEMENT UNIT
16 CONTENT HOLDING UNIT
17 GPS MANAGEMENT UNIT
18 ACCESS MANAGEMENT STORAGE UNIT
19 COMMUNICATION UNIT
20 SUPPORT TERMINAL
21 WEB BROWSER UNIT
22 EXECUTION MANAGEMENT UNIT
23 SMS CONTROLLER
24 SERVER ACCESS MANAGEMENT UNIT
25 DATA HOLDING UNIT
26 ACCESS MANAGEMENT STORAGE UNIT
27 COMMUNICATION UNIT
30 RELAY SERVER
31 ACCESS MANAGEMENT UNIT
32 TERMINAL OPERATION MANAGEMENT STORAGE UNIT
33 SMS DELIVERY MANAGEMENT UNIT
34 TERMINAL ACCESS MANAGEMENT UNIT
35 COMMUNICATION UNIT
40 NETWORK

The invention claimed is:

1. A remote operation system comprising:
a user terminal that comprises a server function unit that operates an internal function of a terminal according to remote operation;
a support terminal including one or more processors configured to remotely operate the user terminal; and
a relay server that comprises an access management unit that holds an access timing to start remote operation of the user terminal by the support terminal, the relay server executing access to the user terminal at the access timing,
wherein when being accessed by the relay server, the user terminal starts up the server function unit to notify the support terminal that the server function unit has been started up,
upon receiving the notification that the server function unit has been started up, the support terminal starts up a remote operation application to execute the remote operation of the user terminal,
when the relay server accesses the user terminal and the server function unit has not been started up, the relay server notifies the support terminal that the server function unit has not been started up, and
upon receiving the notification that the server function unit has not been started up, the support terminal registers the access timing at which the relay server next accesses the user terminal.

2. The remote operation system according to claim 1, wherein the user terminal further comprises a control unit that determines whether to start up the server function unit according to a state of operation of a terminal function in the user terminal when being accessed from the relay server.

3. The remote operation system according to claim 1, wherein the user terminal stops the server function unit upon completion of the remote operation by the support terminal.

4. The remote operation system according to claim 1, wherein the relay server uses a text message which can be received by the user terminal when accessing the user terminal.

5. A remote operation method comprising:
when a relay server accesses a user terminal and a server function unit has not been started up, the relay server notifies a support terminal that the server function unit has not been started up;
upon receiving the notification that the server function unit has not been started up, the support terminal registers an access timing at which the relay server next accesses the user terminal;
receiving a request to start a server function unit that operates an internal function of a terminal according to remote operation to remotely operate a user terminal;
starting up the server function unit after receiving the request;
notifying a support terminal that the server function unit has been started up, the support terminal performing the remote operation; and
accepting the remote operation from the support terminal which has received the notification that the server function unit has been started up.

6. The remote operation system according to claim 2, wherein the user terminal stops the server function unit upon completion of the remote operation by the support terminal.

7. The remote operation system according to claim 2, wherein the relay server uses a text message which can be received by the user terminal when accessing the user terminal.

8. The remote operation system according to claim 3, wherein the relay server uses a text message which can be received by the user terminal when accessing the user terminal.

9. The remote operation system according to claim 6, wherein the relay server uses a text message which can be received by the user terminal when accessing the user terminal.

* * * * *